United States Patent
Koike

(10) Patent No.: US 12,489,458 B2
(45) Date of Patent: Dec. 2, 2025

(54) INTEGRATED CIRCUIT

(71) Applicant: Wacom Co., Ltd., Saitama (JP)

(72) Inventor: Takeshi Koike, Saitama (JP)

(73) Assignee: Wacom Co., Ltd., Saitama (JP)

( * ) Notice: Subject to any disclaimer, the term of this patent is extended or adjusted under 35 U.S.C. 154(b) by 188 days.

(21) Appl. No.: 18/452,458

(22) Filed: Aug. 18, 2023

(65) Prior Publication Data

US 2024/0007126 A1    Jan. 4, 2024

Related U.S. Application Data

(63) Continuation of application No. PCT/JP2021/024202, filed on Jun. 25, 2021.

(51) Int. Cl.
| | |
|---|---|
| *H03M 3/00* | (2006.01) |
| *G06F 3/038* | (2013.01) |
| *G06F 3/041* | (2006.01) |
| *G06F 3/044* | (2006.01) |

(52) U.S. Cl.
CPC .............. *H03M 3/40* (2013.01); *G06F 3/038* (2013.01); *G06F 3/04162* (2019.05); *G06F 3/0441* (2019.05); *H03M 3/344* (2013.01); *H03M 3/43* (2013.01); *H03M 3/464* (2013.01)

(58) Field of Classification Search
CPC .......... H03M 3/40; H03M 3/344; H03M 3/43; H03M 3/464; G06F 3/038; G06F 3/04162; G06F 3/0441
See application file for complete search history.

(56) References Cited

U.S. PATENT DOCUMENTS

| | | | |
|---|---|---|---|
| 7,061,416 B2* | 6/2006 | Nagai | H03M 3/48 |
| | | | 341/172 |
| 10,061,415 B2* | 8/2018 | Bohannon | G06F 3/0418 |
| 2007/0046299 A1 | 3/2007 | Hargreaves et al. | |
| 2016/0320918 A1 | 11/2016 | Hara | |
| 2022/0057894 A1 | 2/2022 | Koike et al. | |

FOREIGN PATENT DOCUMENTS

| | | |
|---|---|---|
| WO | WO 2015111159 A1 | 7/2015 |
| WO | WO 2020230223 A1 | 11/2020 |

OTHER PUBLICATIONS

International Search Report, mailed Aug. 10, 2021, for International Application No. PCT/JP2021/024202. (2 pages).

* cited by examiner

*Primary Examiner* — Khai M Nguyen
(74) *Attorney, Agent, or Firm* — Seed Intellectual Property Law Group LLP

(57) ABSTRACT

A delta-sigma modulation circuit is enabled to be used to detect a pen signal. An integrated circuit according to the present disclosure is a sensor controller that detects pen signals transmitted from an active pen. The integrated circuit includes a delta-sigma modulation circuit including a subtractor that subtracts a feedback signal from a received signal input from a sensor, an integrator that integrates an output signal of the subtractor, a quantizer that quantizes an output signal of the integrator, and a digital analog converter that generates the feedback signal based on an output value of the quantizer. The integrated circuit also has a processor that detects a level of the received signal based on an output value of the delta-sigma modulation circuit, and a gain controller that a level of the feedback signal based on the level of the received signal detected by the processor.

18 Claims, 5 Drawing Sheets

INTEGRATED CIRCUIT

BACKGROUND

Technical Field

The present disclosure relates to an integrated circuit, and particularly, to an integrated circuit for detecting pen signals transmitted by an active pen.

Description of the Related Art

A capacitance detection device that detects passive pointers such as fingers and passive pens is known. A capacitance detection device of this type includes a sensor having a plurality of X electrodes and Y electrodes, and have an integrated circuit that sends a detection signal to the plurality of X electrodes and that sequentially detects the detection signal at a plurality of Y electrodes. The integrated circuit performs processing for deriving the position of a passive pointer on the basis of the detection intensity of the detection signal at each Y electrode.

Detection of the detection signal in the integrated circuit is performed by using an analog-to-digital (A/D) conversion circuit. Patent Document 1 discloses an example of using a delta-sigma modulation circuit as this type of A/D conversion circuit. By using the delta-sigma modulation circuit, quantization noise generated in the A/D conversion circuit can be reduced, so that detection accuracy of the detection signal can be improved.

Further, an active pen that transmits an alternating-current (AC) signal by applying an AC voltage to a pen tip electrode is known. Patent Document 2 discloses an example of this type of active pen. An AC signal transmitted by the active pen is hereinafter referred to as a "pen signal."

PRIOR ART DOCUMENT

Patent Documents

Patent Document 1: U.S. Patent Application Publication No. 2007-0046299
Patent Document 2: PCT Patent Publication No. WO2015/111159

BRIEF SUMMARY

Technical Problem

Here, if the delta-sigma modulation circuit can also be used to detect pen signals, it is considered that the detection accuracy of pen signals can be improved. Conventionally, however, it has not been practical to detect a pen signal by use of a delta-sigma modulation circuit. The reason for this will be explained in detail below.

First, as a premise, a delta-sigma modulation circuit includes a subtractor that subtracts a feedback signal from an input signal, an integrator that integrates an output signal of the subtractor, a comparator that quantizes the output signal of the integrator, and an amplifier for generating the above-mentioned feedback signal by amplifying a pulse signal indicated by a series of output values ("+1" or "−1") of the comparator. Also, the dynamic range of the pen signal input to the A/D conversion circuit is much larger than that of the signal for passive pointer detection. This is because the level (amplitude) of the pen signal that arrives at the sensor changes greatly according to the change in the distance between the pen tip electrode and the touch surface according to the user's operation.

According to the above configuration of the delta-sigma modulation circuit, since the level of the feedback signal is constant regardless of the level of the pen signal that is the input signal, the output signal of the subtractor stops oscillating when the pen tip electrode approaches the touch surface and the level of the pen signal increases beyond a certain level. Then, since the output value of the comparator will not oscillate either, it becomes impossible to detect or demodulate the pen signal by using the output value of the delta-sigma modulation circuit. To prevent this, it is necessary to cause the level of the feedback signal to follow the level of the input signal, and a configuration that has been specifically considered in the prior art for this purpose is to configure a quantization circuit at the output stage with a multibit configuration using a large number (e.g., 129) of comparators.

However, a delta-sigma modulation circuit including many comparators is large in size and expensive. In addition, since an integrated circuit for pen signal detection is normally provided with an A/D conversion circuit for each electrode in the sensor, the increase in size and cost of the delta-sigma modulation circuit is even more remarkable. As a result, conventionally, it has been considered to be difficult to use a delta-sigma modulation circuit for pen signal detection in terms of size and cost.

Therefore, one object of the present disclosure is to provide an integrated circuit that can use a delta-sigma modulation circuit to detect pen signals.

Technical Solution

An integrated circuit according to the present disclosure is an integrated circuit that detects a pen signal transmitted from an active pen, and includes a delta-sigma modulation circuit including a subtractor that, in operation, subtracts a feedback signal from the pen signal that is input from a sensor, an integrator that, in operation, integrates an output signal of the subtractor, a quantizer that quantizes an output signal of the integrator, and a digital analog converter (DAC) that, in operation, generates the feedback signal based on an output value of the quantizer. The integrated circuit also includes a processor that, in operation, detects a level of the pen signal based on an output value of the delta-sigma modulation circuit, and a gain controller that, in operation, controls the level of the feedback signal based on the level of the pen signal detected by the processor.

Advantageous Effect

According to the present disclosure, the level of the feedback signal can be made to follow the level of the pen signal without using a quantizer having a multibit configuration. Therefore, it becomes possible to use a delta-sigma modulation circuit to detect the pen signal.

DETAILED DESCRIPTION

A preferred embodiment of the present disclosure will be described in detail below with reference to the accompanying drawings.

Figure 1:
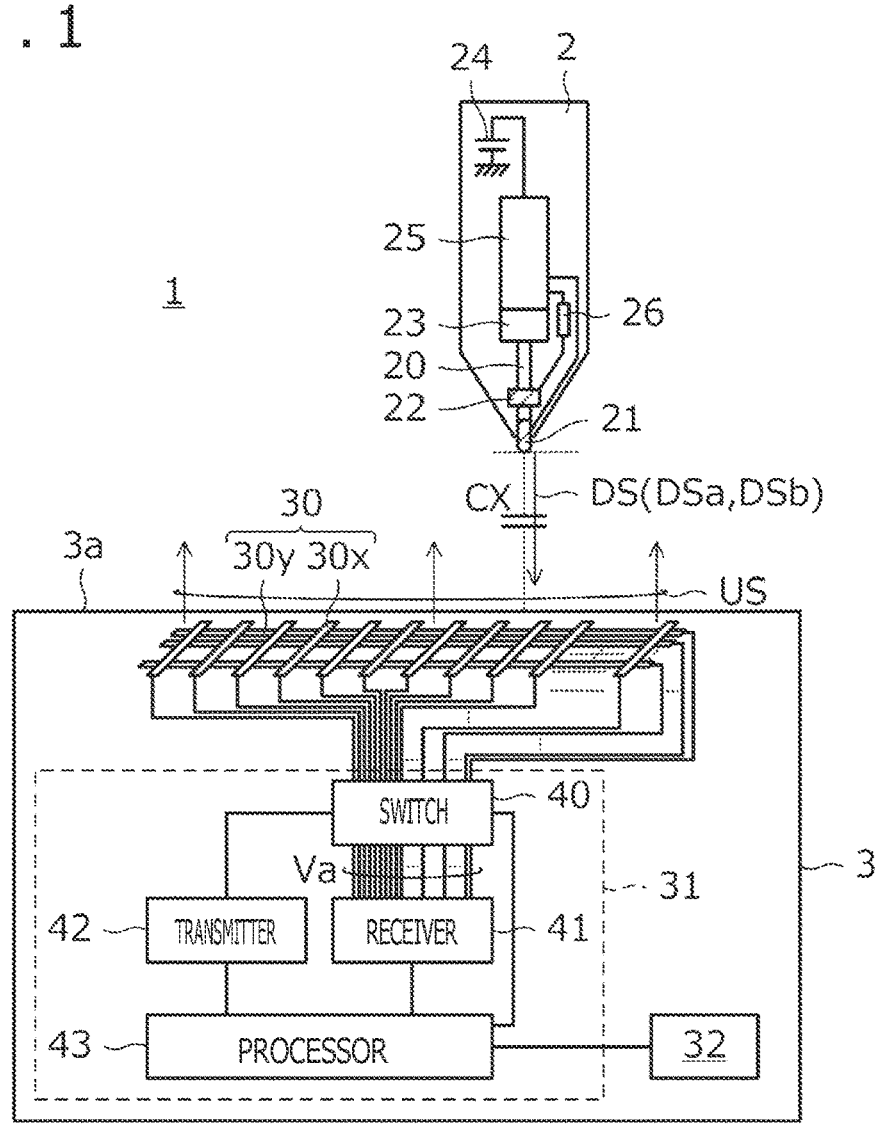
FIG. 1 is a diagram illustrating the configuration of a position detecting system 1 according to an embodiment of the present disclosure.

FIG. 1 is a diagram illustrating the configuration of a position detecting system 1 according to an embodiment of the present disclosure. As illustrated in FIG. 1, the position detecting system 1 includes an active pen 2 and an electronic device 3 that is a position detecting device that detects the active pen 2. Examples of the electronic device 3 include a tablet computer and a device with a digitizer.

The electronic device 3 includes a touch surface 3a, a sensor 30 arranged directly below the touch surface 3a, a sensor controller 31 connected to the sensor 30, and a host processor 32 that controls each part of the electronic device 3 including these parts.

The sensor 30 is a device having a structure in which a plurality of sensor electrodes 30x and 30y are arranged in the touch surface 3a. The plurality of sensor electrodes 30x each extend in a y direction parallel to the touch surface 3a and are arranged at regular intervals in an x direction that is perpendicular to the y direction in the touch surface 3a. The plurality of sensor electrodes 30y each extend in the x direction and are arranged at regular intervals in the y direction.

Here, the electronic device 3 may have a display (not illustrated) arranged to be superposed on the sensor 30, and in this case, the plurality of sensor electrodes 30x (or the plurality of sensor electrodes 30y) can also be used as a common electrode (an electrode for supplying a ground potential to each pixel in common) of the display. The electronic device 3 in the case of this multiple use constitutes what is generally called an "in-cell type" position detecting device. On the other hand, the electronic device 3 in the case where the multiple use is not applied constitutes what is generally called an "on-cell type" or "out-cell type" position detecting device. The present disclosure can be suitably applied to any electronic device 3.

The sensor controller 31 is an integrated circuit having functions of deriving the respective positions of the active pen 2 and a passive pointer in the touch surface 3a, and deriving the tilt of the active pen 2, and further receiving data from the active pen 2. The sensor controller 31 is configured to provide the derived position and tilt, as well as received data, to the host processor 32 successively.

The sensor controller 31 is configured to communicate bidirectionally with the active pen 2 via a capacitance CX generated between the active pen 2 and the sensor 30. Although details will be described later, derivation of the position and tilt of the active pen 2 and reception of data from the active pen 2 are realized through this bidirectional communication. In the following description, a signal transmitted from the sensor controller 31 to the active pen 2 through the above-mentioned bidirectional communication is referred to as an uplink signal US, and a signal transmitted from the active pen 2 to the sensor controller 31 is referred to as a downlink signal DS (pen signal). In addition, although the details will be described later, the active pen 2 has two electrodes for transmitting the downlink signal DS, and, hereinafter, there are cases where, for differentiation, the downlink signal DS transmitted from a pen tip electrode 21 which is one of these electrodes may be referred to as a downlink signal DSa, and where the downlink signal DS transmitted from a ring electrode 22 that is the other electrode may be referred to as a downlink signal DSb.

The sensor controller 31 is also configured to perform processing for supplying (transmitting) a signal for passive pointer detection to each of the plurality of sensor electrodes 30x and sequentially receiving the signals at the plurality of sensor electrodes 30y. Although the details will be described later, derivation of the position of the passive pointer is realized through the passive pointer detection signal thus transmitted and received. Transmission and reception of the passive pointer detection signal and transmission and reception of the uplink signal US and the downlink signal DS described above are performed in a time-sharing manner.

The host processor 32 is a central processing unit of the electronic device 3 and is configured to be able to execute various programs including a drawing application. The drawing application is a program to cause the host processor 32 to execute a process of generating digital ink on the basis of the position, tilt, and data supplied from the sensor controller 31 as well as a process of storing the generated digital ink in the memory in the electronic device 3 and simultaneously displaying the digital ink on the display.

As illustrated in FIG. 1, the sensor controller 31 includes a switch 40, a receiver 41, a transmitter 42, and a processor 43. The switch 40 is a functional unit that switches a connection destination of each of the plurality of sensor electrodes 30x and 30y between the transmitter 42 and the receiver 41 under the control of the processor 43.

The receiver 41 is a functional unit that detects and demodulates a received signal Va supplied from each of the plurality of sensor electrodes 30x and 30y connected via the switch 40, and includes a receiving circuit for each of the sensor electrodes 30x and 30y. The received signal Va can include any one or more of the downlink signal DSa, the downlink signal DSb, and the passive pointer detection signal described above. The frequencies of carrier wave signals of the downlink signal DSa, the downlink signal DSb, and the passive pointer detection signal are different from each other, and each receiving circuit is configured to separately detect the downlink signal DSa, the downlink signal DSb, and the passive pointer detection signal by detecting signals for each frequency.

The transmitter 42 is a functional unit that supplies the uplink signal US or the passive pointer detection signal to the sensor electrodes 30x or the sensor electrodes 30y connected therewith via the switch 40, under the control of the processor 43. Normally, the plurality of sensor electrodes 30x (or the plurality of sensor electrodes 30y) are simultaneously connected to the transmitter 42 at the time of transmitting the uplink signal US, and as a result, the same uplink signal US is transmitted simultaneously from each of the sensor electrodes 30x (or from each of the sensor electrodes 30y). In addition, the passive pointer detection signal is configured by a bit string having different contents for each of the sensor electrodes 30x, and is supplied in parallel to each of the sensor electrodes 30x.

The processor 43 is a functional unit that derives the position and tilt of the active pen 2, receives data from the active pen 2, and derives the position of the passive pointer through control of the switch 40, the receiver 41, and the transmitter 42. The processing performed by the processor 43 will be described in detail below.

First, as processing related to the active pen 2, the processor 43 first causes the transmitter 42 to transmit the uplink signal US at regular intervals. The uplink signal US is a signal that has functions of notifying the active pen 2 of the transmission timing of the downlink signal DS and the reception timing of the next uplink signal US and supplying a command to the active pen 2. The active pen 2 generates the downlink signal DS according to the command supplied by the uplink signal US, transmits the signal at the timing indicated by the notice of the uplink signal US, and receives the next uplink signal US at the timing indicated by the notice of the uplink signal US.

The downlink signal DSa is a signal containing a first position signal, which is an unmodulated carrier wave signal, and a data signal, which is a carrier wave signal modulated by data. A modulation method used for modulation for generating a data signal is typically differential quadrature phase-shift keying (DQPSK) modulation, but other modulation methods such as quadrature amplitude modulation (QAM) may be used. Also, the downlink signal DSb is a signal containing a second position signal, which is an unmodulated carrier wave signal. The processor 43 derives the position of the active pen 2 on the basis of the distribution of the level (reception intensity) of the first position signal at each of the sensor electrodes 30x and 30y. In addition, the processor 43 acquires data transmitted by the active pen 2, by controlling the switch 40 and the receiver 41 such that the data signals are received at one or more of the sensor electrodes 30x and 30y closest to the derived position. The processor 43 further derives the position of the ring electrode 22 on the basis of the distribution of the reception intensity of the second position signal at each of the sensor electrodes 30x and 30y, and derives the tilt of the active pen 2 on the basis of the difference between the derived position of the ring electrode 22 and the position of the active pen 2 derived based on the first position signal.

Next, as processing related to the passive pointer, the processor 43 is configured to repeat, for each of the sensor electrodes 30y, the control to cause the transmitter 42 to supply a bit string prepared in advance for each of the sensor electrodes 30x to each of the sensor electrodes 30x bit by bit in parallel, in the state where one sensor electrode 30y is selected and connected to the receiver 41. The transmitter 42 under the control of the processor 43 performs phase-modulation of a predetermined carrier wave signal to generate each bit and supplies the bit to each of the sensor electrodes 30x.

The receiver 41 is configured to acquire the level of the signal supplied from the selected sensor electrode 30y for each bit and supply the level to the processor 43 each time. The level of the signal supplied to the processor 43 in this manner reflects changes in the capacitance formed at the intersections of the currently selected sensor electrode 30y and each of the sensor electrodes 30x. Therefore, the processor 43 derives the position of the passive pointer on the basis of the level of the signal supplied from the receiver 41.

Next, the active pen 2 is an active type capacitive stylus that bidirectionally communicates with the sensor controller 31, and as illustrated in FIG. 1, includes a core body 20, the pen tip electrode 21, the ring electrode 22, a pressure sensor 23, a battery 24, an integrated circuit 25, and a stop filter 26.

The core body 20 is a member that constitutes a pen shaft of the active pen 2. The tip of the core body 20 constitutes the pen tip of the active pen 2, and the rear end is in contact with the pressure sensor 23. The pen tip electrode 21 and the ring electrode 22 are conductors provided at positions different from each other. The pen tip electrode 21 is arranged at the pen tip of the active pen 2, and the ring electrode 22 is arranged at a position closer to the center of the active pen 2 than the pen tip electrode 21 is, to surround the core body 20.

The pressure sensor 23 is a sensor that detects pressure applied to the tip of the core body 20. The pressure detected by the pressure sensor 23 is supplied as a pen pressure value to the integrated circuit 25 and set in the data signal of the downlink signal DSa by the integrated circuit 25. The battery 24 serves to supply the power necessary for the integrated circuit 25 to operate.

The integrated circuit 25 is an integrated circuit that is constituted by various circuits including a booster circuit, a transmitting circuit, a receiving circuit, and a processing circuit. The transmitting circuit is connected to the pen tip electrode 21 and the ring electrode 22 and serves to transmit the downlink signal DS by applying a change to the pen tip electrode 21 or the ring electrode 22 by using a booster circuit.

The receiving circuit is connected to the ring electrode 22 and serves to receive the uplink signal US by using the ring electrode 22 to detect the uplink signal US. The processing circuit generates the downlink signal DS on the basis of the uplink signal US received by the receiving circuit, and performs processing for causing the transmitting circuit to transmit the generated downlink signal DS.

The stop filter 26 is a filter circuit interlaid between the ring electrode 22 and the integrated circuit 25 such that detection of the uplink signal US by use of the ring electrode 22 and transmission of the downlink signal DSa from the pen tip electrode 21 can be performed simultaneously. To be specific, it is sufficient if the stop filter 26 is configured by use of a band-stop filter (notch filter) that blocks a specific frequency band including the frequency of the downlink signal DSa, a high-pass filter configured to block the pulse wave forming the downlink signal DSa while allowing the pulse wave forming the uplink signal US to pass, or the like. By using the stop filter 26, in the case where the active pen 2 fails to receive the uplink signal US and loses the transmission timing of the downlink signal DS or in other cases, the downlink signal DSa is also transmitted while the uplink signal US continues to be detected, and input with the active pen 2 can thereby be continued.

Figure 2:
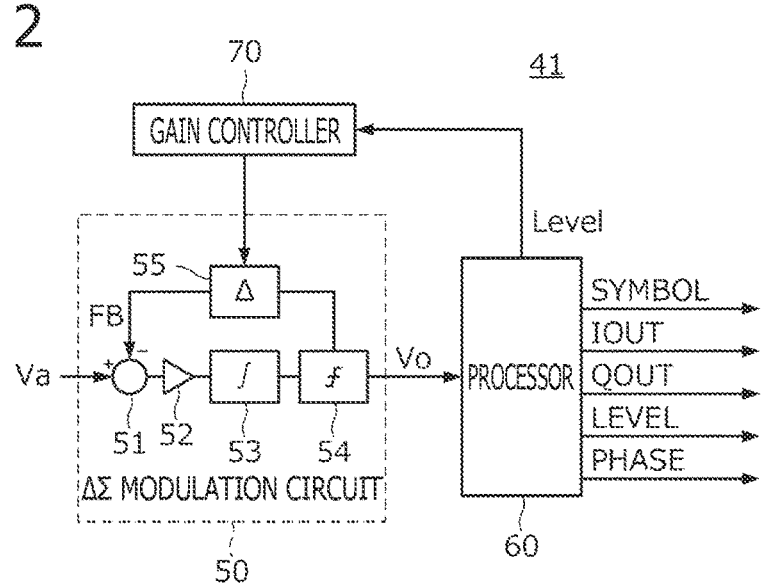
FIG. 2 is a diagram illustrating an example of the configuration of a receiving circuit arranged in a receiver 41.
Figure 4:
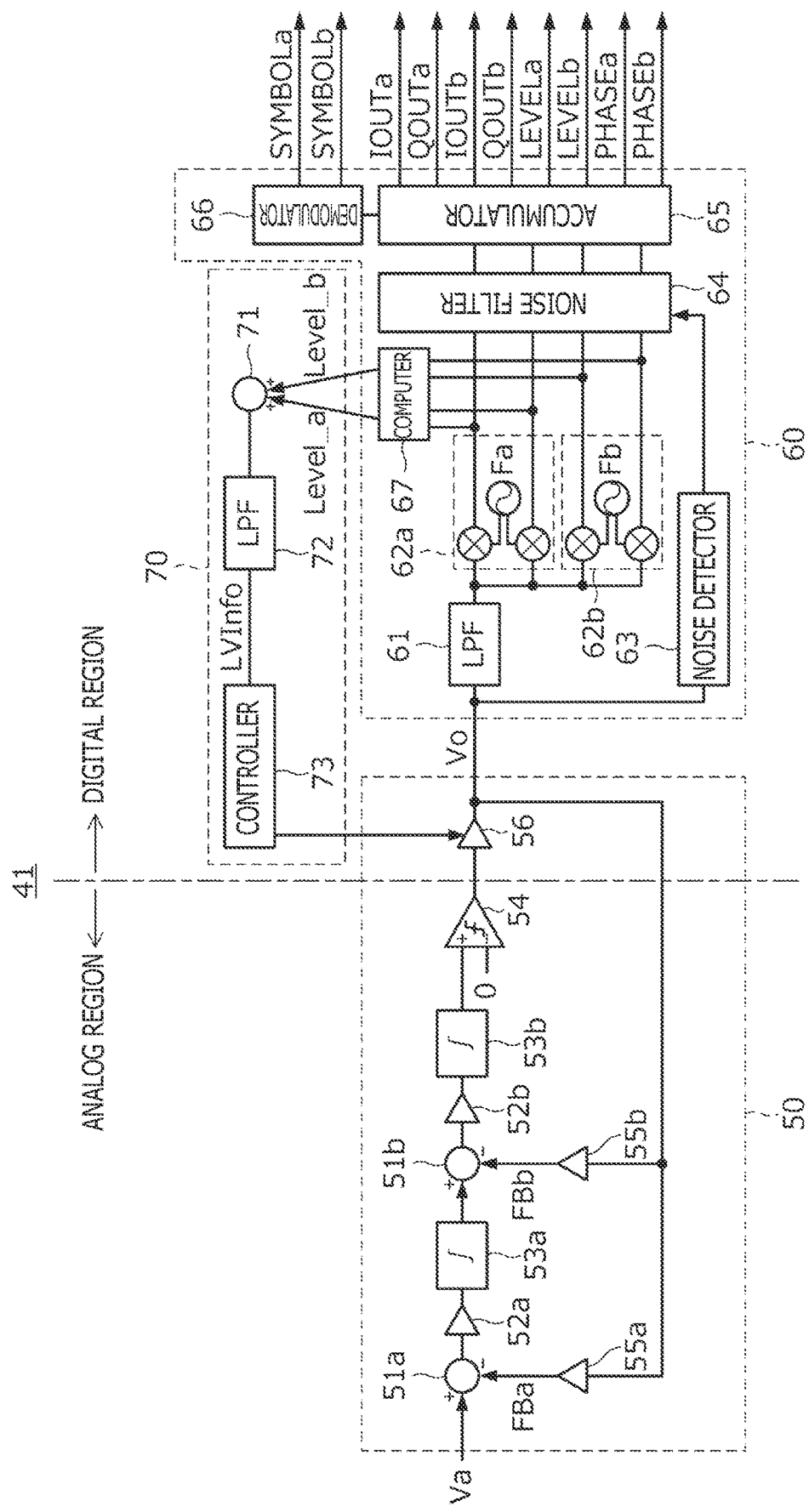
FIG. 4 is a diagram illustrating the configuration of the receiving circuit according to the example illustrated in FIG. 3 in more detail.

FIG. 2 is a diagram illustrating an example of the configuration of a receiving circuit arranged in the receiver 41. As illustrated in FIG. 2, the receiving circuit in the receiver 41 includes a delta-sigma ($\Delta\Sigma$) modulation circuit 50, a processor 60, and a gain controller 70. The delta-sigma modulation circuit 50 includes a subtractor 51, an amplifier 52, an integrator 53, a quantizer 54, and a digital analog converter (DAC) 55. Note that FIG. 2 illustrates an example in which the delta-sigma modulation circuit 50 is constituted by a single-stage configuration having only one integrator 53, but the delta-sigma modulation circuit 50 may be constituted by a multi-stage configuration having a plurality of integrators 53 as illustrated in FIG. 4 to be described later.

The subtractor 51 is a device that subtracts a feedback signal FB, which is an output signal of the DAC 55, from the received signal Va input from the corresponding sensor electrode 30x or sensor electrode 30y. The amplifier 52 serves to control the level of an output signal of the subtractor 51. The integrator 53 is a device that integrates the output signal of the subtractor 51, the output signal being input via the amplifier 52.

The quantizer 54 is a device that quantizes an output signal of the integrator 53, and has one comparator that outputs "1" or "−1" according to threshold determination of the output signal of the integrator 53. Therefore, the delta-sigma modulation circuit 50 is configured to perform 1-bit delta-sigma modulation. The output value of the quantizer 54 is supplied to the processor 60 as an output value Vo of the delta-sigma modulation circuit 50.

The DAC 55 is a device that generates the feedback signal FB on the basis of the output value of the quantizer 54. To be specific, the feedback signal FB is generated by amplifying, by a given amplification factor (gain), a pulse signal indicating a series of output values of the quantizer 54. A specific value for the given amplification factor is set in the DAC 55 by the gain controller 70.

The processor 60 is a functional unit which restores the received signal Va on the basis of a series of output values Vo output from the delta-sigma modulation circuit 50, and performs quadrature detection to generate an in-phase component IOUT, a quadrature component QOUT, a level LEVEL (amplitude), and a phase PHASE of the received signal Va. In a case where the received signal Va is a data signal, the processor 60 also performs processing for generating a symbol string SYMBOL by demodulating the received signal Va on the basis of the generated phase PHASE (and level LEVEL if necessary). The in-phase component IOUT, the quadrature component QOUT, the level LEVEL, the phase PHASE, and the symbol string SYMBOL generated by the processor 60 are supplied to the processor 43 illustrated in FIG. 1. The processor 43 derives the position and tilt of the active pen 2 and the position of the passive pointer on the basis of the level LEVEL supplied in this way, and on the other hand, acquires the data transmitted by the active pen 2 on the basis of the symbol string SYMBOL.

The gain controller 70 is a functional unit that controls the level of the feedback signal FB on the basis of a level Level of the received signal Va generated by the processor 60. Details of this level Level will be described later, but this level is generated based on a signal that has not yet been subjected to noise removal, and may differ from the above level LEVEL in some cases. The gain controller 70 in the example of FIG. 2 controls the level of the feedback signal FB by controlling the amplification factor of the pulse signal in the DAC 55 on the basis of the level Level.

According to the above configuration, the level of the feedback signal FB can be made to follow the level of the received signal Va without using a quantizer having a multibit configuration. Therefore, it becomes possible to use the delta-sigma modulation circuit 50 to detect the downlink signal DS (pen signal) having a large dynamic range.

Figure 3:
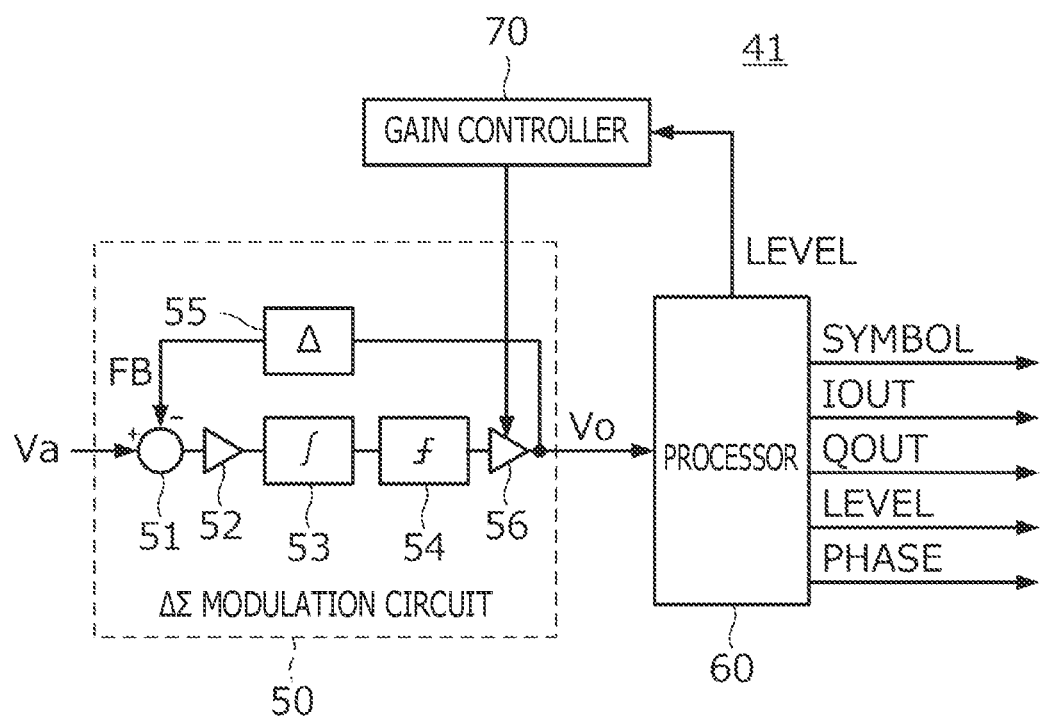
FIG. 3 is a diagram illustrating another example of the configuration of the receiving circuit arranged in the receiver 41.

FIG. 3 is a diagram illustrating another example of the configuration of the receiving circuit arranged in the receiver 41. This example differs from the example of FIG. 2 in that a gain adjustment circuit 56 is provided at the output stage of the quantizer 54 and the gain controller 70 controls the gain of the gain adjustment circuit 56. Even in this way, the level of the feedback signal FB can be made to follow the level of the received signal Va without using a quantizer having a multibit configuration, so that the same effects as those in the example illustrated in FIG. 2 can be obtained.

FIG. 4 is a diagram illustrating in more detail the configuration of the receiving circuit according to the example illustrated in FIG. 3. Note that FIG. 4 illustrates an example in which the delta-sigma modulation circuit 50 has a two-stage configuration. The configuration and operation of the receiving circuit will be described in more detail below with reference to FIG. 4.

As illustrated in FIG. 4, the delta-sigma modulation circuit 50 includes subtractors 51a and 51b, amplifiers 52a and 52b, integrators 53a and 53b, the quantizer 54, and DACs 55a and 55b, which are constituted by analog circuits, and the gain adjustment circuit 56 constituted by a digital circuit.

The subtractor 51a subtracts a feedback signal FBa, which is an output signal of the DAC 55a, from the received signal Va, and supplies the result to the amplifier 52a. The amplifier 52a controls the level of an output signal of the subtractor 51a and supplies the signal to the integrator 53a. The integrator 53a integrates an output signal of the subtractor 51a input via the amplifier 52a, and supplies the result to the subtractor 51b. The subtractor 51b subtracts a feedback signal FBb, which is an output signal of the DAC 55b, from an output signal of the integrator 53a, and supplies the result to the amplifier 52b. The amplifier 52b controls the level of an output signal of the subtractor 51b and supplies the signal to the integrator 53b. The integrator 53b integrates the output signal of the subtractor 51b input via the amplifier 52b and supplies the result to the quantizer 54.

The quantizer 54 is a comparator having a non-inverting input terminal to which an output signal of the integrator 53b is supplied and an inverting input terminal to which the ground potential is supplied, and is configured to output "+1" in a case where the potential of the non-inverting input terminal is greater than the potential of the inverting input terminal and otherwise to output "−1."

The gain adjustment circuit 56 multiplies the output value of the quantizer 54 by a given multiplication value (gain) to generate the output value Vo, and supplies the output value Vo to each of the processor 60 and the DACs 55a and 55b. A specific value of the given multiplication value is set in the gain adjustment circuit 56 by the gain controller 70.

The DACs 55a and 55b respectively generate the feedback signals FBa and Fb by amplifying, by a predetermined amplification factor, a pulse signal indicating the series of output values Vo. A specific value of the predetermined amplification factor may be the same or different between the DAC 55a and the DAC 55b, and is set in advance for each.

The processor 60 includes a low-pass filter 61, quadrature demodulation circuits 62a and 62b, a noise detector 63, a noise filter 64, an accumulator 65, a demodulator 66, and a computer 67.

The low-pass filter 61 is a decimation filter that counts (adds) the output value Vo at regular time intervals to acquire and output an addition average. An output signal of the low-pass filter 61 is a digital signal obtained by restoring the received signal Va.

The quadrature demodulation circuit 62a is a functional unit that performs quadrature detection of the output signal of the low-pass filter 61 at a predetermined frequency Fa. Further, the quadrature demodulation circuit 62b is a functional unit that performs quadrature detection of the output signal of the low-pass filter 61 at a predetermined frequency Fb different from the frequency Fa. Although two quadrature demodulation circuits 62a and 62b are illustrated in FIG. 4, the actual number of quadrature demodulation circuits to be arranged in the processor 60 is determined by the number of frequencies to be used. In a typical example, it is necessary to provide three quadrature demodulation circuits in order to detect the downlink signal DSa, the downlink signal DSb, and the passive pointer detection signal at respective carrier wave signal frequencies. In the case where tilt detection of the active pen 2 is unnecessary, the downlink signal DSb does not have to be used, and in that case, it is sufficient to provide two quadrature demodulation circuits to detect the downlink signal DSa and the passive pointer detection signal, respectively. Further, the downlink signal DSa may be transmitted from each of the plurality of active pens 2 by frequency division multiplex, and in this case, it is necessary to provide a quadrature demodulation circuit for each frequency of the carrier wave signal of the downlink signal DSa. In the following description, it is assumed that two quadrature demodulation circuits 62a and 62b are used as illustrated in FIG. 4.

The quadrature detection performed by the quadrature demodulation circuits 62a and 62b is specifically a process of obtaining the convolution sum (inner product) of the output signal of the low-pass filter 61 and each of a sine wave and a cosine wave of the corresponding frequency. The quadrature demodulation circuits 62a and 62b are configured to output, to the noise filter 64, the in-phase component IOUT that is a convolution sum of the output signal and a cosine wave and the quadrature component QOUT that is a convolution sum of the output signal and a sine wave.

The noise detector 63 is a functional unit that detects impulse noise included in the output value Vo (for example, liquid crystal noise generated from a display) and supplies the detected impulse noise to the noise filter 64. The noise filter 64 performs processing for removing the impulse noise supplied from the noise filter 64, from the signals supplied from the quadrature demodulation circuits 62a and 62b (the in-phase component IOUT and the quadrature component QOUT).

The accumulator 65 is a functional unit that obtains a matching degree vector on the basis of the signal from which the impulse noise has been removed by the noise filter 64 (the in-phase component IOUT and the quadrature component QOUT), further obtains the moving average of each of the length and the inclination of the matching degree vector by using a window of a predetermined time length, and sequentially outputs the obtained average value of the length as the level LEVEL (amplitude) and the average value of the inclination as the phase PHASE, to the processor 43 illustrated in FIG. 1. The accumulator 65 is configured to also output the signal itself supplied from the noise filter 64 (the in-phase component IOUT and the quadrature component QOUT) to the processor 43. Note that, in FIG. 4, "a" is suffixed to each of the in-phase component IOUT, the quadrature component QOUT, the level LEVEL, and the phase PHASE corresponding to the quadrature demodulation circuit 62a, and "b" is suffixed to each of the in-phase component IOUT, the quadrature component QOUT, the level LEVEL, and the phase PHASE corresponding to the quadrature demodulation circuit 62b.

The demodulator 66 is a functional unit that acquires data transmitted by the active pen 2, by demodulating the output value Vo on the basis of the data acquired by the accumulator 65. For example, in a case where the data signal included in the downlink signal DSa is generated by DQPSK modulation, the demodulator 66 is configured to acquire the data transmitted by the active pen 2, on the basis of the phase PHASE acquired by the accumulator 65. Also, for example, in a case where the data signal included in the downlink signal DSa is generated by QAM, the demodulator 66 configured to acquire the data transmitted by the active pen 2, on the basis of the level LEVEL and the phase PHASE obtained by the accumulator 65. The demodulator 66 generates the symbol string SYMBOL indicating the acquired data and outputs the symbol string SYMBOL to the processor 43. In FIG. 4, "a" is suffixed to the symbol string SYMBOL corresponding to the quadrature demodulation circuit 62a, and "b" is suffixed to the symbol string SYMBOL corresponding to the quadrature demodulation circuit 62b.

The computer 67 is a functional unit that derives the level Level (amplitude) for each frequency of the received signal Va by using the results of quadrature detection by the quadrature demodulation circuits 62a and 62b and performs statistical processing of the derived level Level. It is sufficient if the level Level is derived by performing the same processing as the accumulator 65 performs, on the basis of the respective output signals of the quadrature demodulation circuits 62a and 62b (the in-phase component IOUT and the quadrature component QOUT). The statistical processing may be smoothing processing for smoothing the derived level Level or prediction processing for predicting the future level Level on the basis of the level Level derived by then. The computer 67 is configured to supply the level Level for each frequency obtained by the statistical processing to the gain controller 70. Incidentally, in FIG. 4, "_a" is suffixed to the level Level corresponding to the quadrature demodulation circuit 62a (frequency Fa), and "_b" is suffixed to the level Level corresponding to the quadrature demodulation circuit 62b (frequency Fb).

The gain controller 70 includes an adder 71, a low-pass filter 72, and a controller 73. The adder 71 is a level determination circuit that determines the value of the level Level to be used for controlling the levels of the feedback signals FBa and Fb, on the basis of a plurality of levels Level supplied from the computer 67. To be specific, it is sufficient to determine the value of the level Level to be used for the control of the levels of the feedback signals FBa and Fb, by performing a summation process of summing the plurality of levels Level or a selection process of selecting one of the plurality of levels Level (for example, the largest one).

The low-pass filter 72 is a functional unit that generates a control amount LPinfo for the gain adjustment circuit 56 on the basis of the level Level determined by the adder 71. In a specific example, the low-pass filter 72 may be configured by a decimation filter that counts (adds), at regular time intervals, the level Level output from the adder 71, to acquire and output an addition average. The controller 73 controls the gain (multiplication value) of the gain adjustment circuit 56 according to the control amount LPinfo generated by the low-pass filter 72.

Here, the reason why the level LEVEL acquired by the accumulator 65 is not used as the level supplied from the processor 60 to the gain controller 70 is because the gain of the gain adjustment circuit 56 is preferably controlled based on the level of the signal containing noise. As described above, by controlling the gain of the gain adjustment circuit 56 by using the level Level obtained based on the signal that has not yet been subjected to noise removal, it becomes possible to cause the level of the feedback signal to follow the level of the received signal Va actually input to the delta-sigma modulation circuit 50 (received signal Va in a state of including noise).

Figure 5A:
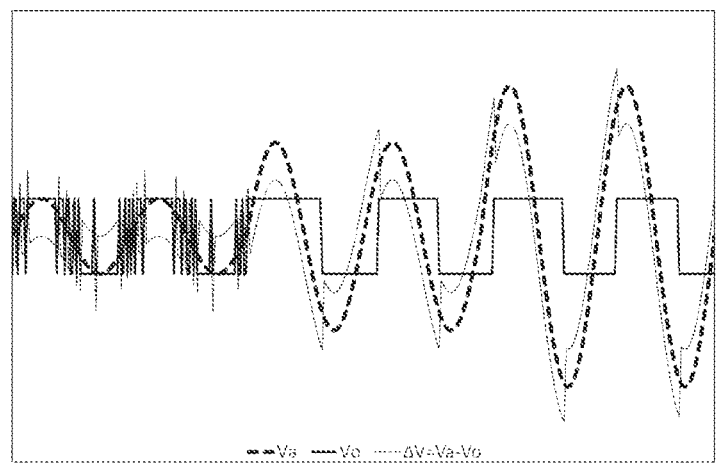
FIGS. 5A to 5C are diagrams illustrating simulation results of a received signal Va and an output value Vo.
Figure 5B:
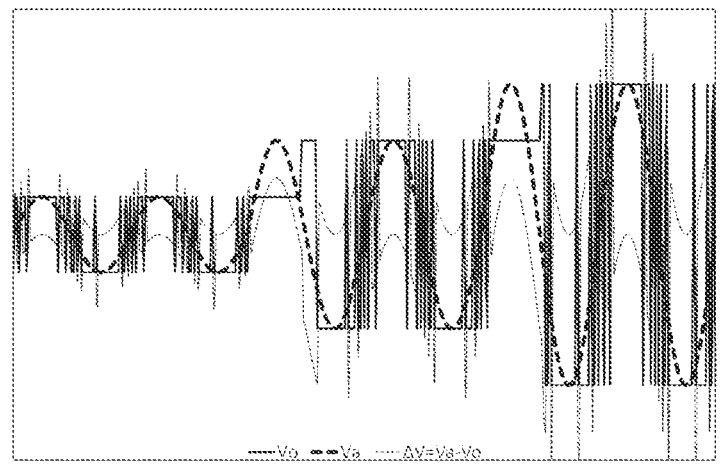
Figure 5C:
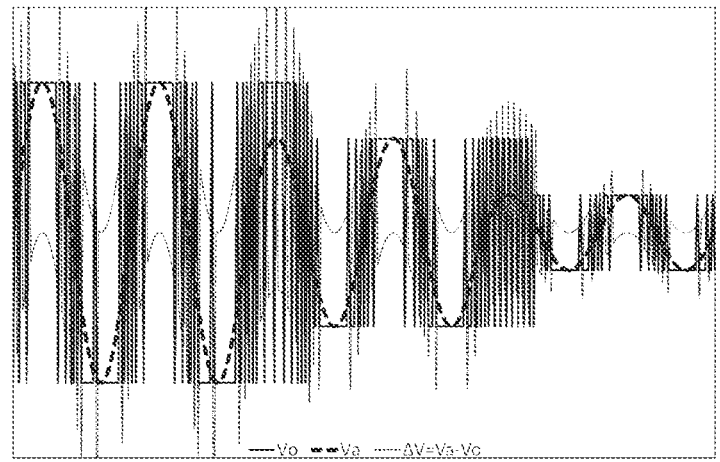

FIGS. 5A to 5C are diagrams illustrating simulation results of the received signal Va and the output value Vo. FIG. 5A illustrates a simulation result of a comparative example in which control by the gain controller 70 is not performed, and FIGS. 5B and 5C illustrate simulation results according to an embodiment in which control is performed by the gain controller 70. In this simulation, it is assumed that the delta-sigma modulation circuit 50 is configured in one stage, and the received signal Va is a sine wave with a predetermined period. Further, in FIGS. 5A and 5B, the level (amplitude) of the received signal Va is increased every two cycles, whereas the level (amplitude) of the received signal Va is decreased every two cycles in FIG. 5C. Moreover, in each figure, the received signal Va, the output value Vo, and an output signal ΔV of the subtractor 51 are plotted.

As illustrated in FIG. 5A, in a case where the control by the gain controller 70 is not performed, the output signal ΔV of the subtractor 51 stops oscillating when the level of the received signal Va increases as the active pen 2 approaches the touch surface 3a, and as a result, the output value Vo also stops oscillating. In this case, since the received signal Va cannot be restored from the output value Vo, the quadrature detection by the processor 60 does not function.

As illustrated in FIG. 5B, if control is performed by the gain controller 70, even if the level of the received signal Va increases as the active pen 2 approaches the touch surface 3a, the oscillating state of the output signal ΔV of the subtractor 51 is maintained, and as a result, the oscillating state of the output value Vo is also maintained. Therefore, the quadrature detection by the processor 60 can be made to function normally. Note that, since there is a certain amount of time lag before the level of the received signal Va is detected by the processor 60, the output value Vo no longer oscillates for a certain period of time after the level of the received signal Va has increased, as illustrated also in FIG. 5B, but the influence of this time lag on the demodulation by the demodulator 66 and the detection of the position and tilt by the processor 43 is minor.

Further, as can be understood from FIG. 5C, according to the control by the gain controller 70, in a case where the level of the received signal Va becomes smaller due to the movement of the active pen 2 away from the touch surface 3a, the gain of the gain adjustment circuit 56 can be reduced. Also in this case, the oscillating states of the output signal ΔV and the output value Vo are maintained. From this result, it is understood that the control by the gain controller 70 can maintain a state in which the quadrature detection by the processor 60 can be performed normally even if the level of the received signal Va variously fluctuates.

Although the preferred embodiment of the present disclosure has been described above, the present disclosure is by no means limited to such an embodiment, and as a matter of course, the present disclosure can be implemented in various forms without departing from the gist thereof.

Figure 6:
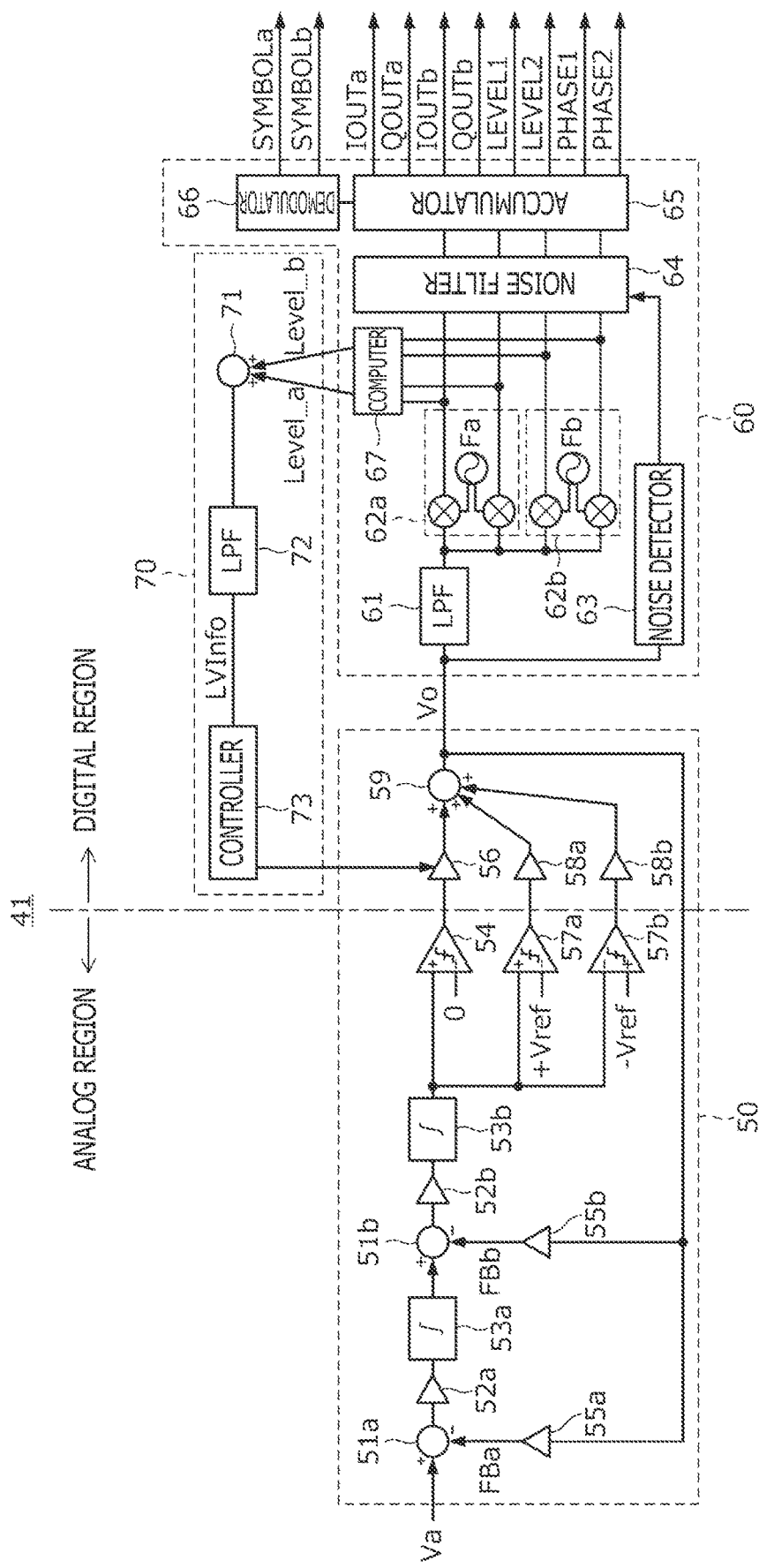
FIG. 6 is a diagram illustrating a receiving circuit included in the receiver 41 according to a modification of the embodiment of the present disclosure.

FIG. 6 is a diagram illustrating a receiving circuit included in the receiver 41 according to a modification of the present embodiment. As can be understood from a comparison between FIG. 6 and FIG. 4, the present modification differs from the present embodiment in that the delta-sigma modulation circuit 50 includes comparators 57a and 57b, gain adjustment circuits 58a and 58b, and an adder 59.

The comparators 57a and 57b are not quantizers, but comparators that each detect that the absolute value of the level of the output signal of the integrator 53b exceeds a predetermined value. In one example, the comparator 57a is configured to output "1" in a case where the level of the output signal of the integrator 53b exceeds a predetermined value Vref (Vref>0) and otherwise to output "0," whereas the comparator 57b is configured to output "1" in a case where the level of the output signal of the integrator 53b is below a predetermined value −Vref and otherwise to output "0."

The gain adjustment circuits 58a and 58b are functional units that multiply the output values of the comparators 57a and 57b by a predetermined value, respectively. In one example, the predetermined value multiplied by the gain adjustment circuit 58a is 64, and the predetermined value multiplied by the gain adjustment circuit 58a is −64.

The adder 59 is a functional unit that controls the levels of the feedback signals FBa and Fb by adding the output values of the gain adjustment circuits 58a and 58b to the output value of the gain adjustment circuit 56. Since the output values of the gain adjustment circuits 58a and 58b become values other than 0 only in a case where the absolute value of the level of the output signal of the integrator 53b exceeds a predetermined value, the adder 59 controls the levels of the feedback signals FBa and Fb in a case where the comparators 57a and 57b detect that the absolute value of the level of the output signal of the integrator 53b exceeds a predetermined value.

According to the present modification, in a case where the level of the received signal Va increases beyond the adjustment range of the gain controller 70 and, as a result, the absolute value of the output signal of the integrator 53b becomes too large, the absolute value of the output signal of the integrator 53b can be reduced by controlling the levels of the feedback signals FBa and Fb. Therefore, even if the level of the received signal Va increases beyond the adjustment range of the gain controller 70, the delta-sigma modulation circuit 50 can be used to detect the downlink signal DS (pen signal).

Further, in the above embodiment, although the case where the active pen 2 and the sensor controller 31 communicate bidirectionally has been described, the present disclosure can also be suitably applied to a case where the active pen 2 and the sensor controller 31 performs one-way communication to the sensor controller 31 from the active pen 2.

Moreover, in the above embodiment, an example of using the quantizer 54 constituted by one comparator has been described, but the present disclosure can also be applied to a case of using a multibit configuration quantizer including a plurality of comparators. One or more of the functional units described herein may be implemented by a processor and a memory storing instructions that, when executed by the processor, cause the processor to perform the functions of the one or more of the functional units described herein.

DESCRIPTION OF REFERENCE SYMBOLS

1: Position detecting system
2: Active pen
3: Electronic device
3a: Touch surface
20: Core body
21: Pen tip electrode
22: Ring electrode
23: Pressure sensor
24: Battery
25: Integrated circuit
26: Stop filter
30: Sensor
30x, 30y: Sensor electrode
31: Sensor controller
32: Host processor
40: Switch
41: Receiver
42: Transmitter
43: Processor
50: Delta-sigma modulation circuit
51, 51a, 51b: Subtractor 52, 52a, 52b: Amplifier
53, 53a, 53b: Integrator
54: Quantizer
55, 55a, 55b: DAC
56: Gain adjustment circuit
57a, 57b: Comparator
58a, 58b: Gain adjustment circuit
59: Adder
60: Processor
61: Low pass filter
62a, 62b: Quadrature demodulation circuit
63: Noise detector
64: Noise filter
65: Accumulator
66: Demodulator
67: Computer
70: Gain controller
71: Adder
72: Low pass filter
73: Controller
DS, DSa, DSb: Downlink signal
FB, FBa, FBb: Feedback signal
Fa, Fb: Frequency
IOUT, IOUTa, IOUTb: In-phase component
LEVEL, LEVELa, LEVELb: Level
Level, Level_a, Level_b: Level
LPinfo: Control amount
PHASE, PHASEa, PHASEb: Phase
QOUT: Quadrature component
SYMBOL: Symbol string
US: Uplink signal
Va: Received signal
Vo: Output value The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An integrated circuit that detects a pen signal transmitted from an active pen, the integrated circuit comprising:
  a delta-sigma modulation circuit including:
    a subtractor that, in operation, subtracts a feedback signal from the pen signal that is input from a sensor,
    an integrator that, in operation, integrates an output signal of the subtractor,
    a quantizer that, in operation, quantizes an output signal of the integrator, and
    a digital analog converter that, in operation, generates the feedback signal based on an output value of the quantizer;
  a processor that, in operation, detects a level of the pen signal based on an output value of the delta-sigma modulation circuit;
  a gain controller that, in operation, controls a level of the feedback signal based on the level of the pen signal detected by the processor; and
  a gain adjustment circuit that, in operation, generates the output value of the delta-sigma modulation circuit by adjusting a gain of the output value of the quantizer,
  wherein the digital analog converter, in operation, generates the feedback signal based on the output value of the delta-sigma modulation circuit, and
  wherein the gain controller, in operation, controls the level of the feedback signal and the output value of the delta-sigma modulation circuit by controlling the gain of the gain adjustment circuit based on the level of the pen signal detected by the processor.

2. The integrated circuit according to claim 1, wherein the delta-sigma modulation circuit, in operation, performs 1-bit delta-sigma modulation for which the quantizer is constituted by one comparator.

3. The integrated circuit according to claim 1, wherein the gain controller, in operation, controls the level of the feedback signal by controlling the digital analog converter based on the level of the pen signal detected by the processor.

4. The integrated circuit according to claim 1, wherein, in the delta-sigma modulation circuit, the subtractor, the integrator, and the quantizer are configured by analog circuits, and the gain adjustment circuit is configured by a digital circuit.

5. The integrated circuit according to claim 1, wherein the processor includes a low-pass filter that, in operation, restores the pen signal based on the output value of the delta-sigma modulation circuit and a quadrature demodulation circuit that, in operation, performs quadrature detection of the pen signal restored by the low-pass filter, and
  the processor, in operation, detects the level by using a result of the quadrature detection.

6. An integrated circuit that detects a pen signal transmitted from an active pen, the integrated circuit comprising:
  a delta-sigma modulation circuit including:
    a subtractor that, in operation, subtracts a feedback signal from the pen signal that is input from a sensor,
    an integrator that, in operation, integrates an output signal of the subtractor,
    a quantizer that, in operation, quantizes an output signal of the integrator, and
    a digital analog converter that, in operation, generates the feedback signal based on an output value of the quantizer;
  a processor that, in operation, detects a level of the pen signal based on an output value of the delta-sigma modulation circuit; and
  a gain controller that, in operation, controls a level of the feedback signal based on the level of the pen signal detected by the processor,
  wherein the processor includes a low-pass filter that, in operation, restores the pen signal based on the output value of the delta-sigma modulation circuit and a quadrature demodulation circuit that, in operation, performs quadrature detection of the pen signal restored by the low-pass filter,
  wherein the processor, in operation, detects the level by using a result of the quadrature detection, and
  wherein the processor, in operation, detects the level by performing statistical processing of a level derived using the result of the quadrature detection.

7. The integrated circuit according to claim 6, wherein the statistical processing is smoothing processing that smooths the level derived using the result of the quadrature detection or prediction processing that predicts a future level based on the derived level.

8. The integrated circuit according to claim 6, wherein the processor includes a noise filter that, in operation, removes noise from an output signal of the quadrature demodulation circuit, and wherein the processor, in operation, detects the level based on the output signal of the quadrature demodulation circuit, the output signal being obtained before noise thereof is removed by the noise filter.

9. The integrated circuit according to claim 6, wherein the processor includes a plurality of quadrature demodulation circuits that, in operation, perform quadrature detection at frequencies different from each other, and wherein the processor detects the level for each of the quadrature demodulation circuits.

10. The integrated circuit according to claim 9, wherein the gain controller includes a level determination circuit that, in operation, determines the level of the pen signal to be used to control the level of the feedback signal, based on a plurality of levels detected by the processor.

11. The integrated circuit according to claim 10, wherein the level determination circuit, in operation, performs a summation process of summing the plurality of levels detected by the processor or a selection process of selecting one of the plurality of levels detected by the processor, to determine the level of the pen signal to be used to control the level of the feedback signal.

12. The integrated circuit according to claim 6, wherein the delta-sigma modulation circuit, in operation, performs 1-bit delta-sigma modulation for which the quantizer is constituted by one comparator.

13. The integrated circuit according to claim 6, wherein the gain controller, in operation, controls the level of the feedback signal by controlling the digital analog converter based on the level of the pen signal detected by the processor.

14. The integrated circuit according to claim 6, wherein the processor includes a low-pass filter that, in operation, restores the pen signal based on the output value of the delta-sigma modulation circuit and a quadrature demodulation circuit that, in operation, performs quadrature detection of the pen signal restored by the low-pass filter, and the processor, in operation, detects the level by using a result of the quadrature detection.

15. An integrated circuit that detects a pen signal transmitted from an active pen, the integrated circuit comprising:

a delta-sigma modulation circuit including:
  a subtractor that, in operation, subtracts a feedback signal from the pen signal that is input from a sensor,
  an integrator that, in operation, integrates an output signal of the subtractor,
  a quantizer that, in operation, quantizes an output signal of the integrator,
  a digital analog converter that, in operation, generates the feedback signal based on an output value of the quantizer,
  a comparator that, in operation, detects that an absolute value of a level of the output signal of the integrator exceeds a predetermined value, and
  an adder that, in operation, controls the level of the feedback signal in a case where the comparator detects that the absolute value of the level of the output signal of the integrator exceeds the predetermined value;

a processor that, in operation, detects a level of the pen signal based on an output value of the delta-sigma modulation circuit; and a gain controller that, in operation, controls a level of the feedback signal based on the level of the pen signal detected by the processor.

16. The integrated circuit according to claim 15, wherein the delta-sigma modulation circuit, in operation, performs 1-bit delta-sigma modulation for which the quantizer is constituted by one comparator.

17. The integrated circuit according to claim 15, wherein the gain controller, in operation, controls the level of the feedback signal by controlling the digital analog converter based on the level of the pen signal detected by the processor.

18. The integrated circuit according to claim 15, wherein the processor includes a low-pass filter that, in operation, restores the pen signal based on the output value of the delta-sigma modulation circuit and a quadrature demodulation circuit that, in operation, performs quadrature detection of the pen signal restored by the low-pass filter, and the processor, in operation, detects the level by using a result of the quadrature detection.

* * * * *